United States Patent
Wilson et al.

(10) Patent No.: US 11,448,801 B2
(45) Date of Patent: Sep. 20, 2022

(54) TEXTURED GLASS LAYERS IN ELECTRONIC DEVICES

(71) Applicant: Apple Inc., Cupertino, CA (US)

(72) Inventors: James R. Wilson, Cupertino, CA (US); Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 16/848,732

(22) Filed: Apr. 14, 2020

(65) Prior Publication Data

US 2021/0033757 A1    Feb. 4, 2021

Related U.S. Application Data

(60) Provisional application No. 62/880,597, filed on Jul. 30, 2019.

(51) Int. Cl.
*G02B 1/10* (2015.01)
*G02B 5/02* (2006.01)
*G02B 5/28* (2006.01)

(52) U.S. Cl.
CPC ......... *G02B 5/0221* (2013.01); *G02B 5/0268* (2013.01); *G02B 5/288* (2013.01)

(58) Field of Classification Search
CPC .... G02B 5/0221; G02B 5/0268; G02B 5/288; G02B 5/02; G02B 5/0205; G02B 5/021; G02B 5/0215; G02B 5/0231; G02B 5/0273; G02B 5/0278; G02B 5/0294; G02B 5/28; G02B 5/285; G02B 5/286; G02B 5/287

USPC ........ 359/580, 577, 586, 588, 589, 590, 599
See application file for complete search history.

(56) References Cited

U.S. PATENT DOCUMENTS

| | | | |
|---|---|---|---|
| 4,705,356 A | 11/1987 | Berning et al. | |
| 5,214,530 A | 5/1993 | Coombs et al. | |
| 6,847,483 B2 * | 1/2005 | Lippey | G03B 21/60 359/449 |
| 7,693,557 B2 | 4/2010 | Nuovo et al. | |
| 8,081,373 B2 * | 12/2011 | Kothari | G02B 26/001 359/578 |
| 8,199,488 B2 | 6/2012 | Zou et al. | |

(Continued)

FOREIGN PATENT DOCUMENTS

| CN | 104656175 A | 5/2015 |
|---|---|---|
| CN | 204644191 U | 9/2015 |

(Continued)

*Primary Examiner* — Arnel C Lavarias
(74) *Attorney, Agent, or Firm* — Treyz Law Group, P.C.; David K. Cole

(57) ABSTRACT

An electronic device may have a housing surrounding an interior in which electrical components are mounted. A display may be mounted to housing structures in the device. The housing may have a rear wall. The display cover layer and rear wall of the housing may be formed from transparent glass layers. Coatings may be formed on inwardly facing surfaces of the transparent glass layers. A coating on a transparent glass layer may be formed from a thin-film interference filter having a stack of dielectric layers. The coating may include an ink layer on the thin-film interference filter. The transparent glass layers may have one or more textured surfaces that allow light at high angles to enter the transparent layers and reflect off the coatings at high angles, thereby adjusting optical properties of the coatings.

14 Claims, 19 Drawing Sheets

(56) References Cited

U.S. PATENT DOCUMENTS

| | | |
|---|---|---|
| 8,568,184 B2 | 10/2013 | Prest et al. |
| 8,730,551 B2 | 5/2014 | Neuman et al. |
| 8,824,140 B2 | 9/2014 | Prest et al. |
| 9,081,230 B2 | 7/2015 | Huang et al. |
| 9,128,327 B2 | 9/2015 | Yang et al. |
| 9,232,670 B2 | 1/2016 | Pakula et al. |
| 9,316,843 B2 | 4/2016 | Ishiguro |
| 9,678,258 B2 | 6/2017 | Hankey et al. |
| 9,785,299 B2 | 10/2017 | Wickboldt et al. |
| 9,800,717 B2 | 10/2017 | Ma et al. |
| 10,021,798 B2 | 7/2018 | Prest et al. |
| 10,237,382 B2 | 3/2019 | Hosoi et al. |
| 10,292,286 B2 | 5/2019 | Wilson et al. |
| 10,405,446 B2 | 9/2019 | Choi et al. |
| 2004/0027672 A1* | 2/2004 | Bourdelais ............ G02B 5/287 359/586 |
| 2004/0233524 A1* | 11/2004 | Lippey .................. G03B 21/60 359/443 |
| 2009/0046240 A1 | 2/2009 | Bolton |
| 2009/0080076 A1 | 3/2009 | Fujikura et al. |
| 2011/0012873 A1 | 1/2011 | Prest et al. |
| 2012/0050975 A1 | 3/2012 | Garelli et al. |
| 2012/0235183 A1 | 9/2012 | Fukuda |
| 2013/0083506 A1 | 4/2013 | Wright et al. |
| 2013/0236699 A1 | 9/2013 | Prest et al. |
| 2013/0320823 A1 | 12/2013 | Kiple et al. |
| 2014/0139978 A1 | 5/2014 | Kwong |
| 2014/0168864 A1 | 6/2014 | Lin |
| 2014/0226269 A1 | 8/2014 | Shedletsky et al. |
| 2015/0121677 A1 | 5/2015 | Prest et al. |
| 2015/0146144 A1 | 5/2015 | Fang et al. |
| 2015/0248142 A1 | 9/2015 | Qian et al. |
| 2016/0170539 A1 | 6/2016 | Watanabe et al. |
| 2016/0231617 A1 | 8/2016 | Hong et al. |
| 2016/0313494 A1 | 10/2016 | Hamilton et al. |
| 2017/0048365 A1 | 2/2017 | Wright et al. |
| 2018/0321425 A1 | 11/2018 | Hart et al. |
| 2019/0037690 A1 | 1/2019 | Wilson et al. |
| 2019/0056385 A1 | 2/2019 | Gershtein et al. |

FOREIGN PATENT DOCUMENTS

| | | | |
|---|---|---|---|
| CN | 105144397 A | * 12/2015 | ....... H01L 31/02165 |
| CN | 109473042 A | 3/2019 | |
| CN | 109923445 A | 6/2019 | |
| TW | 201343573 A | 11/2013 | |
| TW | 201528912 A | 7/2015 | |
| TW | 201901190 A | 1/2019 | |
| TW | 201910882 A | 3/2019 | |
| WO | 2008144656 A3 | 11/2008 | |

* cited by examiner

TEXTURED GLASS LAYERS IN ELECTRONIC DEVICES

This application claims the benefit of provisional patent application No. 62/880,597, which is hereby incorporated by reference herein in its entirety.

FIELD

This relates generally to electronic devices and, more particularly, to textured transparent layers and associated coatings that provide color-shifting optical properties in electronic devices.

BACKGROUND

Electronic devices such as cellular telephones, computers, watches, and other devices may contain glass structures. For example, electronic devices may have displays in which an array of pixels is covered with a transparent layer of glass. In some devices, a rear housing wall may be covered with a layer of glass. A decorative layer may be applied to the layer of glass to help improve the appearance of the rear housing wall or may be applied to an inactive portion of the transparent layer of glass that covers the display.

It may be desirable to improve the outward appearance of the display cover layer in the inactive area or the output appearance of a glass housing layer.

SUMMARY

An electronic device may have a housing in which a display is mounted. The housing may be formed from housing structures that surround an interior region in the electronic device. Electrical components may be mounted in the electronic device interior.

The display may be coupled to the housing structures on a front face of the electronic device. The housing structures may include a rear wall on an opposing rear face of the electronic device.

A display cover layer for the display may have a surface that faces the interior of the housing. The rear wall may also have a surface that faces the interior of the housing. Structures in the electronic device such as the display cover layer and rear housing wall may be formed from transparent glass layers. Coatings may be formed on the inwardly facing surfaces of the transparent glass layers. The transparent glass layers may have textured surfaces opposite the inwardly facing surfaces that allow light at high viewing angles to pass into the glass layers and be reflected by the underlying coatings. In this way, optical properties of the housing may change when viewed by a user at different viewing angles.

A coating on a transparent glass layer may be formed from a thin-film interference filter having a stack of dielectric layers. The coating may also include an ink layer on the thin-film interference filter.

DETAILED DESCRIPTION

Electronic devices such as cellular telephones often include glass members such as display cover glass layers and glass housing members. These layers are traditionally coated with materials such as ink. The ink may be opaque to hide internal device components from view, but may not always have a desired appearance. The appearance of glass layers in an electronic device can be altered by depositing inorganic layers such as physical vapor deposition (PVD) inorganic layers onto the glass layers. Alternatively or additionally, coatings that include thin-film interference filters and ink layers may be applied to the glass layers. In these coatings, thin-film interference filter layers may be arranged to produce non-neutral colors or to produce neutral colors. The thin-film interference filter layers may be coated with ink such as neutrally colored ink or ink with a non-neutral color. Optional buffer layer material may be included in the coatings. In some configurations, thin-film interference layers may be supported by a polymer film and attached to a transparent glass layer using a layer of adhesive.

Challenges arise, however, in ensuring that the deposited layers produce desired optical effects (e.g., desired transmission, opacity, and reflection values at various viewing angles). In some embodiments, it may be desirable to form coatings on transparent layers that shift color at different viewing angles. To ensure that the coatings are viewable at large viewing angles, a surface of the transparent layers may be textured. In this way, light may be transmitted through the transparent layer and reflect off of the coatings at large viewing angles, which may result in a color shift in the reflected light.

Figure 1:
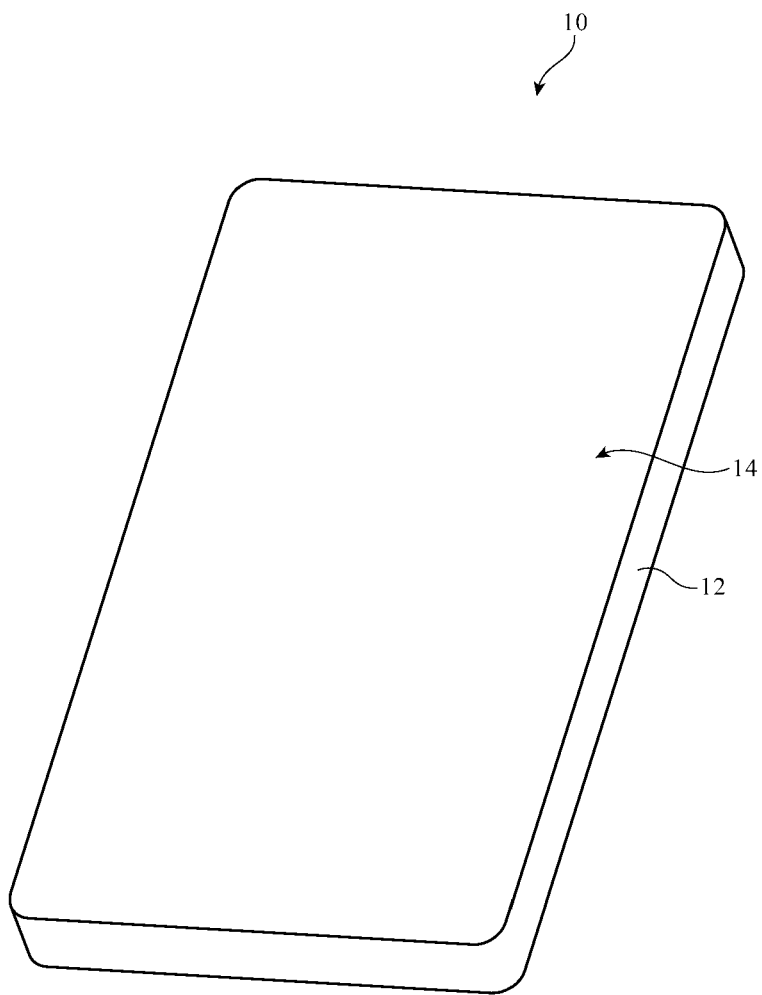
FIG. 1 is a perspective view of an illustrative electronic device in accordance with an embodiment.

An illustrative electronic device of the type that may have one or more textured glass structures is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of glass. For example, the outermost layer of display 14, which may sometimes be referred to as a display cover layer, may be formed from a hard transparent material such as glass to help protect display 14 from damage. Other portions of device 10 such as portions of housing 12 and/or other structures may also be formed from glass. For example, walls in housing 12 such as a rear housing wall may be formed from glass.

Figure 2:
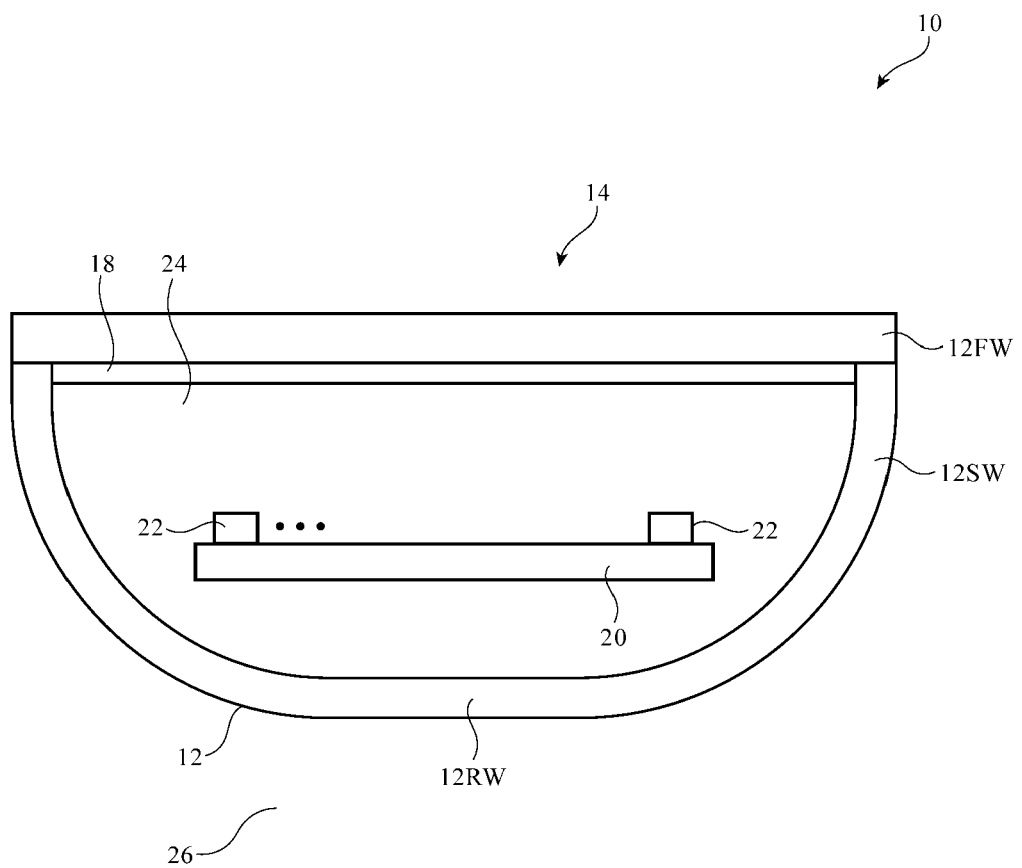
FIG. 2 is a cross-sectional side view of an illustrative electronic device having transparent layers forming housing walls in accordance with an embodiment.

A cross-sectional side view of device 10 is shown in FIG. 2. As shown in FIG. 2, device 10 may have an interior 24 in which electrical components 22 are housed. Electrical components 22 may include integrated circuits, sensors, and other circuitry. As examples, electrical components 22 may form wireless communications circuitry, wireless charging circuitry, processing circuitry, and/or display circuitry, as examples. In general, any desired circuitry may be formed in device 10. Components 22 may be mounted on one or more printed circuits such as printed circuit 20.

As shown in FIG. 2, device 10 may have opposing front and rear faces. Display 14 may be formed on the front face of device 10 and may be covered by a front housing wall 12FW. Housing 12 may have a rear housing wall 12RW on the opposing rear face of device 10. Portions of housing 12 may also form sidewalls 12SW for device 10. These sidewall portions of housing 12 may be formed from a material such metal, may be formed from a glass substrate layer, may be formed from the same layer as rear housing wall 12RW, and/or may be formed from the same layer as front housing wall 12FW, as examples.

Display 14 may include a display cover layer (e.g., a layer of glass) that forms front wall 12FW of housing 12 and may include display module 18 (e.g., display layers that form an array of pixels that present images for a user on the front face of device 10). Display module 18 may be a liquid crystal display structure, an organic light-emitting diode display structure, or other suitable display. During operation, module 18 may present images that are viewable through front housing wall 12FW. The rear of the housing for device 10 may be formed from a glass structure (e.g., rear housing wall 12RW may formed from a glass layer). The thickness of rear housing wall 12RW may be 0.2-5 mm, at least 0.05 mm, at least 0.1 mm, at least 0.2 mm, at least 0.5 mm, at least 0.75 mm, less than 1 mm, less than 2 mm, or other suitable thickness. If desired, a metal plate or other strengthening structures may be laminated to portions of the inner surface of rear housing wall 12RW and/or sidewalls 12SW to enhance strength.

Inactive border areas in front housing wall 12FW and portions of other glass structures in device 10 such as some or all of rear housing wall 12RW and/or sidewalls 12SW may be covered with coatings and other structures. In some arrangements, a coating may be used primarily to block light (e.g., to hide internal device structures from view). For example, a coating may be formed on the inner surface of rear housing wall 12RW to hide internal components from view from a user. In other arrangements, a patterned coating may be used to form text, logos, trim, and/or other visible patterns. Coatings that are unpatterned and that coat all of rear housing wall 12RW and/or sidewalls 12SW may also be used to block internal structures from view and/or to provide device 10 with a desired appearance. Patterned coatings may create visible elements and may also block internal structures from view.

Coatings for glass structures in device 10 may be black or other neutral colors or may have non-black (non-neutral) colors (e.g., blue, red, yellow, gold, rose gold, red-violet, pink, etc.). In some configurations, some or all of the coatings for glass structures in device 10 may be shiny (e.g., exhibiting a mirror-like reflective surface with a reflectance of at least 50%, at less 80%, at least 95%, less than 99.99%, or other suitable reflectance).

If desired, a coating may be formed on one or more layers that have textured regions. In particular, glass forming rear housing wall 12RW, sidewalls 12SW, and/or front wall 12FW may be have surfaces facing exterior 26 that are completely textured, partially textured, or untextured. If desired, these layers may have internal surfaces that are coated with inks, physical vapor deposition (PVD) layers, and/or thin-film interference filter coatings. These coatings and the texture on the glass layers may be tuned to appear neutral (e.g., exhibit a neutral color) at low viewing angles (e.g., head-on viewing angles) and non-neutral (e.g., exhibit a non-neutral color) at high viewing angles (e.g. grazing angles). In this way, a combination of texture on glass housing surfaces and underlying coating layers may be used to provide color-shifting properties on an electronic device housing.

Coatings on rear housing wall 12RW and/or other glass structures in device 10 may be formed from metals, semiconductors, and/or dielectrics. Dielectric materials for the coatings may include organic materials such as polymer layers and/or inorganic materials such as oxide layers, nitride layers, and/or other inorganic dielectric materials. In arrangements in which a shiny surface is desired, a metal coating with a high reflectivity or a thin-film interference filter with dielectric layers (e.g., a stack of dielectric layers of alternating higher and lower refractive index values) may be configured to serve as a mirror coating (reflective coating). Ink coatings may also be incorporated onto the glass structures, if desired.

Figure 3:
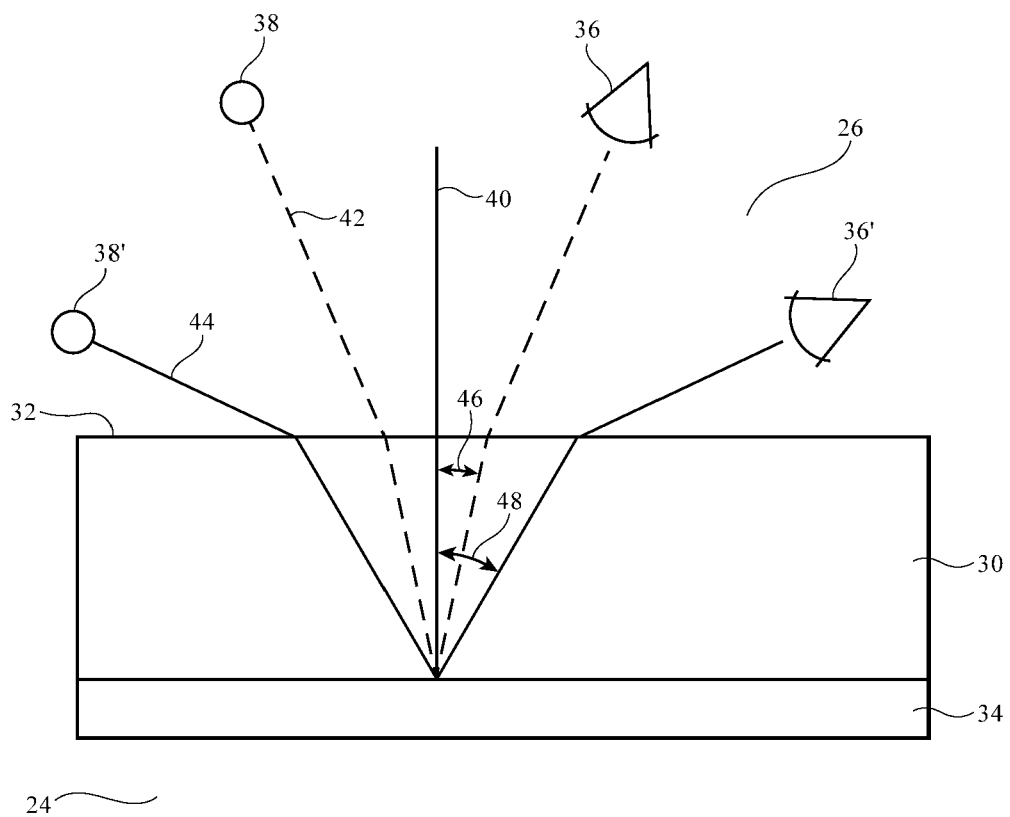
FIG. 3 is a cross-sectional side view of a smooth glass layer having a reflective coating in accordance with an embodiment.

FIG. 3 is a cross-sectional side view of an illustrative transparent layer 30, such as a glass layer, with a polished front surface 32 and a coating 34 on an opposing rear surface. As an example, transparent layer 30 may form one or more of rear housing wall 12RW, sidewalls 12SW, or front housing wall 12FW of FIG. 2. In general, coating 34 may be any desired coating and may include one or more of ink layers, film layers, dielectric layers, thin-film interference filter layers, or other desired layers.

As shown in FIG. 3, a user 36 may view glass layer 30 from the exterior 26 of device 10. User 36 may see light 42 that has been emitted from light source 38, refracted by polished surface 32, reflected by coating 34 at angle 46, and been refracted by polished surface 32 to an eye of user 36. Angle 46 may be measured from normal axis 40 and may be less than 5°, less than 10°, less than 15°, or may be less than 20°, as examples. The refraction of light 42 may be due to a difference in the index of refraction between the air at exterior 26 and glass layer 30. Air may have a refractive index of approximately 1.0, and layer 30 may have a refractive index of approximately 1.5 or 1.6. However, layer 30 may be formed from different materials and therefore may have a different refractive index. In general, any difference in refractive index between the air and layer 30 may cause refraction when light enters and exits layer 30.

In some cases, it may be desired for a user to view glass layer 30 from a larger angle (e.g., a greater angle when measured from an axis normal to surface 32). For example, user 36' may see light 44 that has been emitted from light source 38', refracted by polished surface 32, reflected by coating 34 at angle 48, and been reflected by polished surface 32 to an eye of user 36'. As shown in FIG. 3, angle 48 may be greater than angle 46, and may be less than 40°, less than 43°, or less than 45°, as examples. Because user 36' is viewing layer 30 at such a large angle, user 36' will receive light that has entered layer 30 at a grazing angle (e.g., a very large angle when measured from an axis normal to surface 32). As examples, the grazing angle may be greater than 50°, greater than 55°, greater than 60°, greater than 70°, greater than 80°, or less than 90°.

In general, angle 48 may be the maximum angle at which light viewed by a user may be viewed due to polished surface 32 refracting light 44 into layer 30. The maximum angle may be approximately 43°, for example. In some embodiments, however, it may be desirable to allow light to reflect at larger angles off of coating 34 and be visible to user 36. An arrangement that allows light to reflect off of coating 34 at larger angles is shown in FIG. 4.

Figure 4:
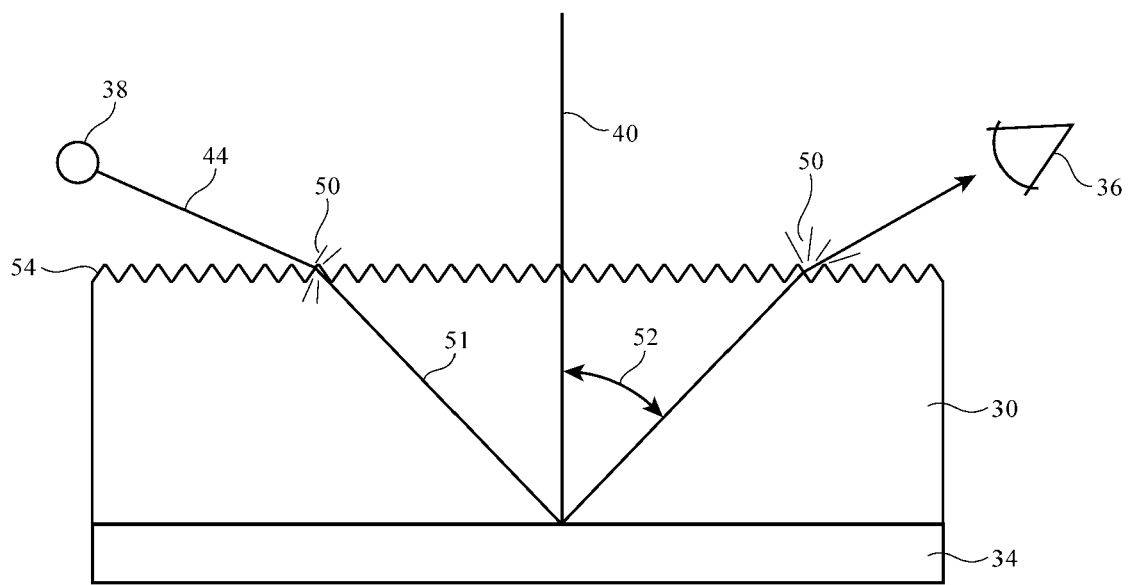
FIG. 4 is a cross-sectional side view of a textured glass layer having a reflective coating in accordance with an embodiment.

As shown in FIG. 4, transparent layer 30, which may be a glass layer, for example, may be provided with a textured exterior surface, such as textured surface 54. User 36 may view glass layer 30 from a grazing angle, such as the grazing angle described above in connection with FIG. 3. Due to the textured surface, however, light 44 that is emitted by light source 38 may be scattered by textured surface 54, which is illustrated by scattered light 50. Some of the scattered light will enter layer 30 as refracted light 51, which will be reflected off of coating 34 at angle 52. Angle 52 may be larger than angle 48 of FIG. 3. For example, angle 52 may be greater than 45°, greater than 50°, or greater than 60°. Light reflected by coating 34 may then be scattered by textured layer 54 and be viewed by user 36. In this way, having a textured surface on layer 30 may allow light reflected by coating 34 at larger angles to be viewed by user 36.

Figure 5:
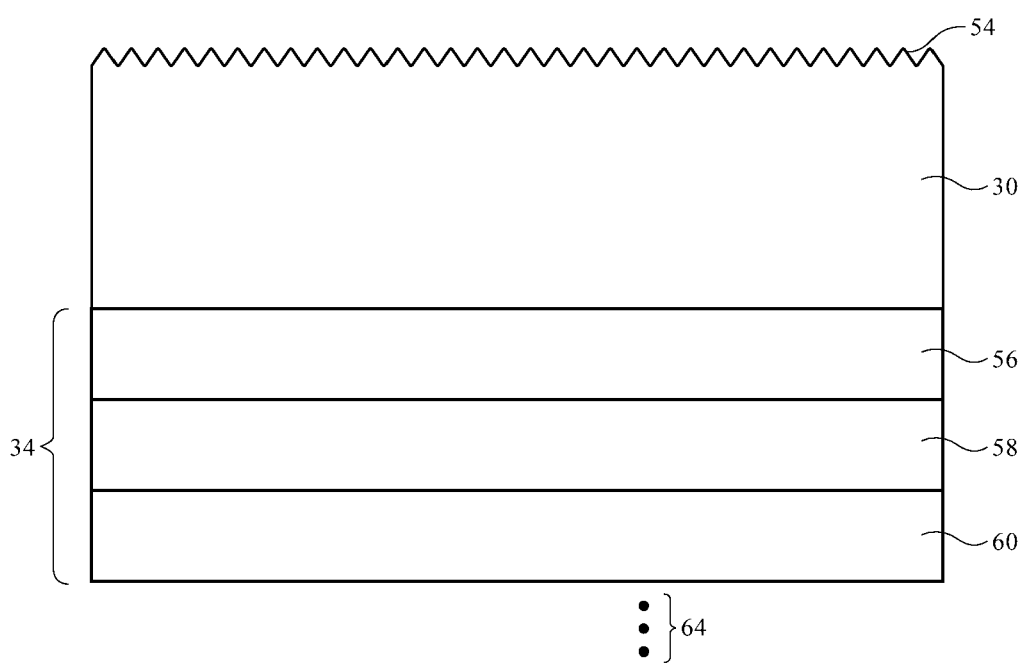
FIG. 5 is a cross-sectional side view of a textured glass layer having a coating formed from a plurality of layers in accordance with an embodiment.

An illustrative coating 34 on layer 30 having textured surface 54 is shown in FIG. 5. Textured surface 54 may be defined by semi-spherical or semi-cylindrical bumps, randomly distributed recesses and protrusions (e.g., recesses and protrusions formed through a process such as sand blasting), or may be defined by any other desired texture. Textured surface 54 may have protruding surface structures that are 100 s of nm to 1 micron in height (e.g., at least 100 nm, at least 500 nm, less than 5 microns, less than 1 micron). Surface 54 may have an RMS surface roughness of 100 nm to 2 microns or other suitable value that provides a desired appearance (e.g., a matte appearance). This may be in contrast with polished surfaces or other smooth surfaces, which may have protruding surface features that are less than 5 nm in height, surfaces with features that are less than 50 nm in height, etc.). Smooth surfaces may have an RMS surface roughness of less the RMS surface roughness of the textured surfaces (e.g., an RMS surface roughness of less than 25 nm or other suitable value that provides a desired appearance such as a smooth and potentially reflective appearance).

In general, layer 30 may be glass, sapphire, ceramic, or any other desired material. In general, layer 30 may be a transparent layer having any desired haze value. For example, layer 30 may exhibit at least 5% haze, at least 10% haze, at least 20% haze, at least 30% haze, or less than 60% haze.

Layer 30 may be coated with coating 34, which may include optional buffer layer 56, dielectric layer 58, optional ink layer 60, and optional additional layer 64. Optional buffer layer 56 may be polymer, such as epoxy, polyester, etc. In some embodiments, buffer layer 56 may be formed from a polymer binder with embedded particles, such as silica spheres that control the index of refraction of buffer layer 56 and provide improved adhesion between layers 56 and 30. However, this is merely illustrative. In general, buffer layer may be formed from any desired material to reduce the stresses applied to layer 30 by underlying layers.

Buffer layer 56 may have any desired thickness, such as 1-3 microns, at least 0.5 microns, at least 1 micron, less than 4 microns, or other suitable thickness. In some embodiments, optional buffer layer 56 may be formed to provide protection for layer 30 when underlying layer 58 is applied.

Thin-film interference filter 58 may be formed on optional buffer layer 56, or in the absence of buffer layer 56, directly on glass layer 30 (e.g., through PVD operations). In some cases, thin-film interference filter 58 may be formed on a polymer layer and attached to glass layer 30. Thin-film interference filter 58 may include multiple thin-film dielectric layers of alternating high and low indices of refraction. In this way, thin-film interference filter 58 may produce interference effects when light passes into filter 58 from layer 30.

In general, thin-film interference filter 58 may be formed using any desired process. For example, one or more layers of thin-film interference filter 58 may be applied using physical vapor deposition (PVD). It may be desirable to include buffer layer 56 to reduce stress applied to glass layer 30 when thin-film interference filter 58 is applied using PVD techniques.

Optional layer 60 may be applied to a lower surface of thin-film interference filter 58. Layer 60 may be include any suitable coating materials. With one illustrative configuration, layer 60 may include one or more ink layers. The one or more ink layers in layer 60 may be formed from polymer containing colorant such as dye and/or pigment. The colorant may have a neutral color such as white, gray, or black, may have a non-neutral color such as red, blue, green, yellow, gold, or may have another suitable color.

Additional optional layers 64 may include support layers, additional thin-film interference layers, or any other desired coating layers. For example, optional layers 64 may include a metal support layer, a dielectric support layer, and/or a metal oxide support layer.

Figure 6:
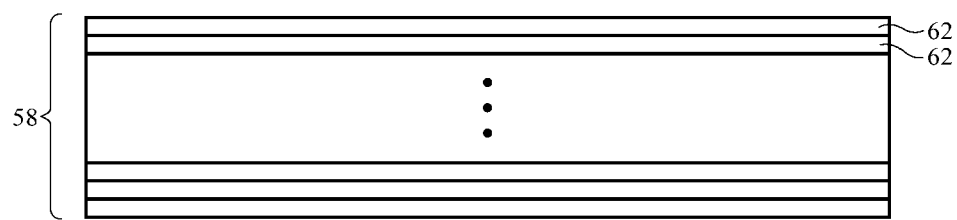
FIG. 6 is a cross-sectional side view of a thin-film interference filter formed from a plurality of dielectric layers in accordance with an embodiment.

The thin-film interference filter layer of FIG. 5 may be formed from individual layers. As shown in FIG. 6, thin-film interference filter 58 may be formed from individual thin-film dielectric layer 62. Layers 62 may have thicknesses of 0.01-1 micron, at least 0.05 microns, at least 0.1 microns, at least 0.15 microns, less than 1.5 microns, less than 1 micron, etc. Layers 62 may be inorganic dielectric layers (e.g. oxides such as silicon oxide, niobium oxide, titanium oxide, tantalum oxide, zirconium oxide, magnesium oxide, etc., nitrides such as silicon nitride, oxynitrides, and/or other inorganic dielectric materials). Organic dielectric layers (e.g., clear polymer layers) and/or other materials (thin metal films, semiconductor layers, etc.) may also be included in the thin-film stack, if desired. In general, thin-film stack 58 may be formed from any desired number of layers 62 that have any desired individual thicknesses. In this way, thin-film stack 58 may be tuned to have desirable optical properties.

In the example of FIG. 6, the thin-film stack formed from layers 62 forms thin-film interference filter 58. Filter 58 may be formed form dielectric materials such as inorganic dielectric layers deposited with physical vapor deposition techniques and may therefore sometimes be referred to as a physical vapor deposition layer, physical vapor deposition coating, or physical vapor deposition stack. Other techniques for forming filter 58 may be used, if desired.

Filter 58 may be configured to exhibit high reflectivity (e.g., filter 58 may be configured to form a dielectric mirror that reflects a relatively large amount of light), may be configured to exhibit low reflectivity, may be configured to form a colored (tinted) layer (e.g., by reflecting one or more selected colors of light such as when configuring filter 58 to serve as a bandpass filter, band-stop filter, low pass filter, or high pass filter), and/or may be configured to from a light-blocking layer (e.g., by exhibiting a high opacity). Layers 62 may also be configured to adjust the optical properties (transmission, reflection, absorption) of filter 58 at multiple different values of angle A (e.g., an angle A with respect to surface normal n for filter 58 that is associated with an incident angle of incoming light). For example, filter 58 may be configured to adjust the optical properties of layer 30 and coating 34 at different angles 52 relative to normal axis 40 of FIG. 4.

Layers 62 may include inorganic materials such as oxides. For example, layers 62 may include one or more silicon oxide layers and one or more niobium oxide layers. Niobium oxide can be deposited consistently using sputtering and may allow filter 58 to exhibit good color control. Other oxides may be used (e.g., one or more tantalum oxide layers 62 may be interspersed with one or more silicon oxide layers in filter 62, one or more titanium oxide layers 62 may be interspersed with one or more silicon oxide layers, etc.). In some arrangements, higher and lower refractive index materials alternate in the stack of layers forming filter 58. For example, filter 58 may include alternating niobium oxide layers and silicon oxide layers, may include alternating titanium oxide and silicon oxide layers, or may include alternating tantalum oxide layers and silicon oxide layers.

Figure 7:
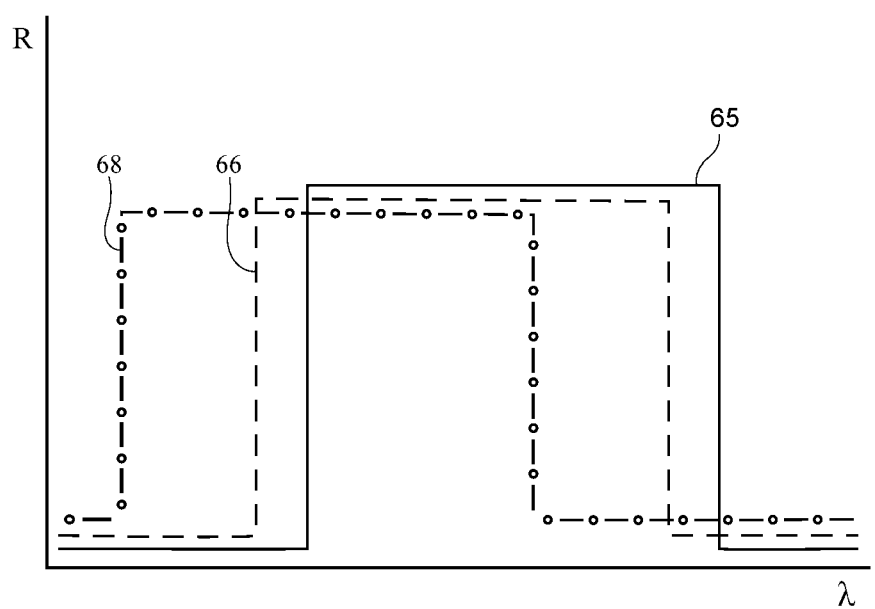
FIG. 7 is a graph of reflectivity profiles for illustrative coating layers at different viewing angles in accordance with an embodiment.

FIG. 7 is a graph containing curves 65, 66, and 68 for respective illustrative reflectivity profiles for filter 58 at a 0° viewing angle (e.g., an angle along normal axis 40 of FIGS. 3 and 4), at a maximum reflection angle for a polished glass layer (e.g., angle 48 of FIG. 3), and at a maximum reflection angle for a textured glass layer (e.g., angle 52 of FIG. 4).

The optical characteristics of filter 58 can be tuned (at one or more values of angle A) by adjusting the attributes of layers 62 (e.g., index of refraction, thickness, etc.). The optical properties of filter 58 may also be adjusted by adjusting the number of layers 62 in filter 58. With one illustrative configuration, the overall thickness of filter 58 is maintained at a relatively low value (e.g., 80-300 nm, less than 3 microns, less than 2 microns, less than 1 micron, at least 0.1 micron) by limiting the thicknesses of each of layers 62 (e.g., to less than 1.5 microns, less than 1 micron, less than 0.5 microns, less than 0.4 microns, etc.) and by limiting the number of layers 62 in filter 58 (e.g., to 2-6, at least 2, at least 3, at least 4, at least 5, fewer than 20, fewer than 14, fewer than 10, fewer than 7, etc.). In general, filter 58 need not be restricted to these configurations and may contain any suitable types of layers 58 and/or may include layers 58 of any suitable thickness, index of refraction, etc.

As shown by curve 65, filter 58 may be tuned such that coating 34 has peak reflectivity at a range of wavelengths. The peak relativity may be at least 60%, at least 70%, at least 80%, or less than 99%, as examples. This range of wavelengths may encompass the entire spectrum of visible wavelengths (e.g., 400-700 nm), may encompass a portion of visible wavelengths, may include infrared wavelengths (e.g., 700-900 nm), and/or may include ultraviolet wavelengths (e.g., 300-400 nm), as examples.

Curve 65 may correspond to the wavelengths of light viewed through layer 30 (e.g., light that has entered layer 30, been reflected by coating 34, and been refracted out of layer 30) at a 0° angle (e.g., along an axis normal to layer 30). At higher viewing angles, different wavelengths of light may be reflected. As shown by curve 66, at a viewing angle such as angle 48 of FIG. 3, the reflected light may shift in wavelength toward lower wavelengths. Curve 66 may correspond to light viewed at a maximum reflectivity angle for a glass layer with a polished outer surface, such as glass layer 30 with polished surface 32 in FIG. 3. In some embodiments, it may be desired to have a larger maximum shift of reflected wavelengths through layer 30. For example, it may be desired to have a rear surface of an electronic device appear neutral (e.g., reflect a neutral color) at low angles of view and appear non-neutral (e.g., reflect a non-neutral color) at high angles of view.

Curve 68 may correspond to light viewed at a maximum reflectivity angle for a glass layer with a textured outer surface, such as glass layer 30 with textured surface 54 of FIGS. 4 and 5. As shown by curve 68, light reflected through a coated, textured glass layer may shift more toward lower wavelengths at higher angles of view than the maximum shift allowed by a coated, polished glass layer. In this way, coating 34 may appear neutral at a 0° viewing angle, and may appear non-neutral at a grazing viewing angle through a textured glass layer. In the example of FIG. 7, coating 34 may appear neutral on-axis and blue off-axis, as examples. However, this is merely illustrative. The texture of surface 54 may be adjusted to change the maximum angle of reflectance at filter 58, and the composition of filter 58 (and other layers in coating 34, if desired) may be adjusted to change the optical properties of the light reflected by the coating at different viewing angles, thereby adjusting its appearance to a user.

In some arrangements, it may be desirable for filter 58 to be configured to exhibit a color tint at 0° viewing angles (rather than being neutral at on-axis viewing angles). For example, it may be desirable for filter 58 to reflect red light so that the coated, textured glass layer appears pink or to reflect light that provides filter 58 with a gold appearance in reflection.

The apparent color of filter 58 (e.g., light reflected off of filter 58) may be characterized by a color in CIELAB color space (also referred to as LAB color space herein). With one illustrative configuration, thin-film interference filter 58, operates as a partially reflective mirror (e.g., a mirror of 10-20% reflectivity, or a reflectivity of at least 5%, at least 15%, at least 20%, less than 85%, less than 60%, less than 50%, less than 35%, or other suitable value) and exhibits a neutral color in reflection at on-axis viewing angles (e.g., viewing angles less than 45°, less than 42°, or less than 43°) and a non-neutral color at off-axis viewing angles (e.g., viewing angles less than 45°, less than 42°, or less than 43°. In this configuration, for example, the color of reflected light may be characterized by LAB color coordinates a* and b* (also referred to as color coordinates a and b herein). The square-root of the sum of the squares of color coordinates a and b (e.g., the root sum squared of color coordinates a and b) may be less than 3, less than 2, or less than 1 at on-axis viewing angles, and may be greater than 3, greater than 2, or greater than 1 at off-axis viewing angles. In this way, the reflected light may appear neutral (e.g., reflect a neutral color) on-axis and non-neutral (e.g., reflect a non-neutral color) off-axis. Moreover, the luminance (L coordinate in LAB color space), may change less than 5%, less than 15%, less than 25%, or more than 10% over viewing angles between 0° and 75°.

Although illustrated in FIG. 7 to be reflective of a range of wavelengths (e.g., a range of visible light wavelengths, infrared light wavelengths, and/or other desired wavelengths), filter 58 may have any desired reflectivity profile.

Figure 8:
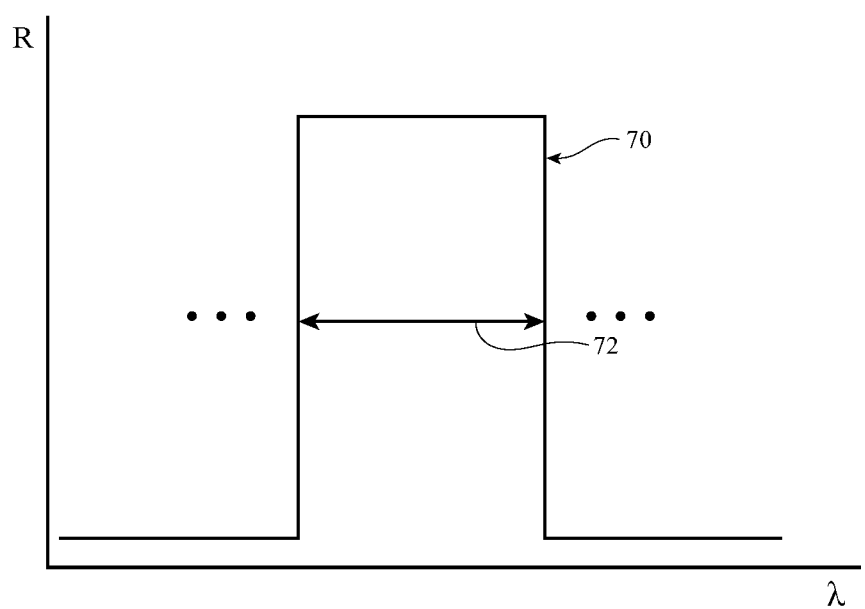
FIG. 8 is a graph of reflectivity profiles for illustrative coating layers that form band stop filters in accordance with an embodiment.

As shown in FIG. 8, coating 34 and/or filter 58 may have a reflectivity profile (or a portion of a reflectivity profile) corresponding to curve 70. In an embodiment, curve 70 may represent filter 58 being a band stop filter (e.g., reflecting light at a desired range of wavelengths). Band stop filter 58 may exhibit a band-width 72 defined as a full-width half-max band-width, a 10%-90% band-width, or any other desired band-width of at least 5 nm, at least 10 nm, at least 15 nm, at least 25 nm, at least 50 nm, at least 100 nm, of less than 500 nm, or less than 400 nm, as examples. In general, band stop filter 58 may be configured to have any desired band-width 72. As discussed above in connection with FIG. 7, band 70 may cover (e.g., exhibit high reflectivity in) the entire spectrum of visible wavelengths, may cover a portion of visible wavelengths, may cover some or all infrared wavelengths, and/or may cover some or all ultraviolet wavelengths. Additionally, although band stop filter 58 has been illustrated with a single reflectivity peak (e.g., band), band stop filter 58 may include more than one reflectivity peak, if desired.

Figure 9:
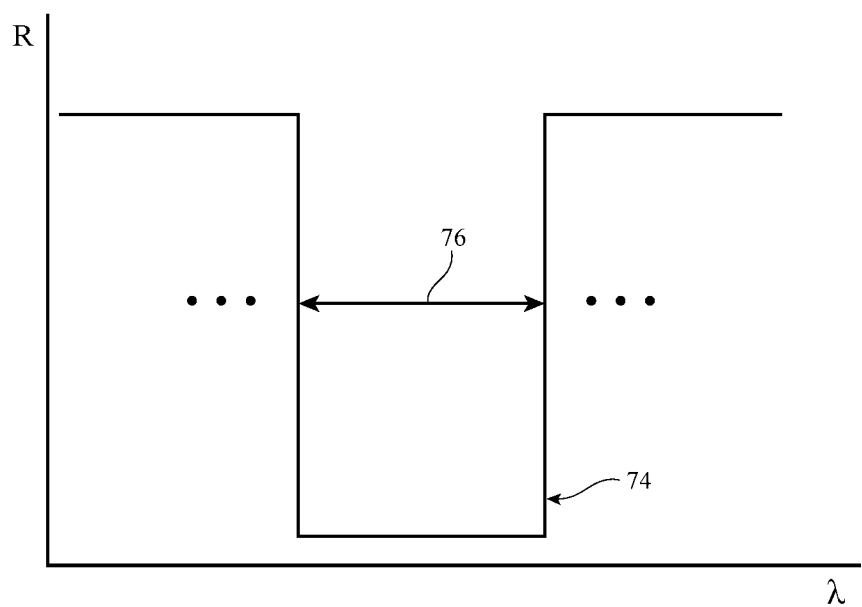
FIG. 9 is a graph of reflectivity profiles for illustrative coating layers that form band pass filters in accordance with an embodiment.

As shown in FIG. 9, coating 34 and/or filter 58 may have a reflectivity profile (or a portion of a reflectivity profile) corresponding to curve 74. In an embodiment, curve 74 may represent filter 58 being a band pass filter (e.g., passing/transmitting light at a desired range of wavelengths). Band pass filter 58 may exhibit a band-width 76 defined as a full-width half-max band-width, a 10%-90% band-width, or any other desired band-width of at least 5 nm, at least 10 nm, at least 15 nm, at least 25 nm, at least 50 nm, at least 100 nm, of less than 500 nm, or less than 400 nm, as examples. In general, band pass filter 58 may be configured to have any desired band-width. Band 74 may cover (e.g., exhibit low reflectivity/high transmission in) the entire spectrum of visible wavelengths, may cover a portion of visible wavelengths, may cover some or all infrared wavelengths, and/or may cover some or all infrared wavelengths. Additionally, although band pass filter 58 has been illustrated with a single transmission peak (e.g., band), band pass filter 58 may include more than one transmission peak, if desired.

Figure 10:
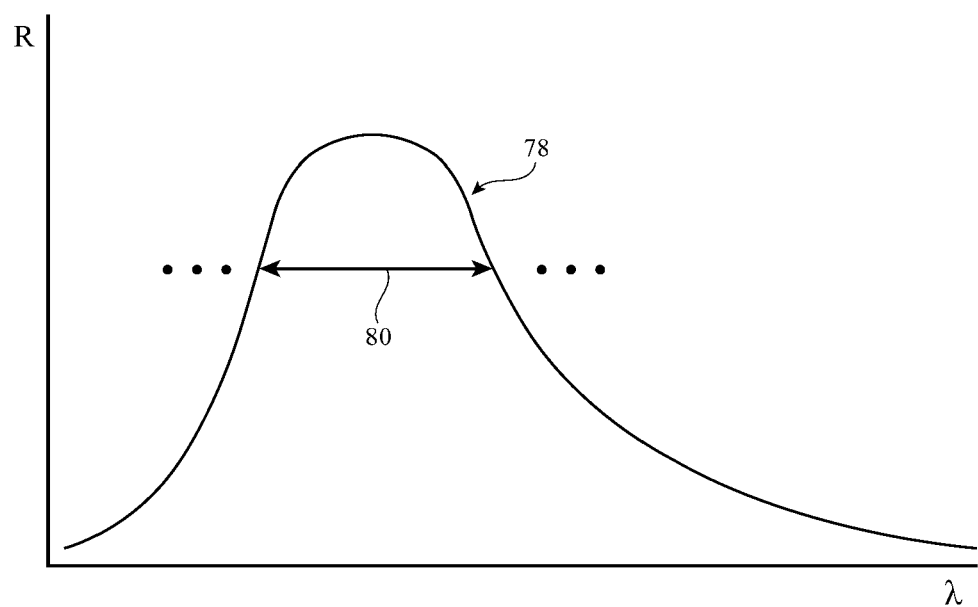
FIG. 10 is a graph of reflectivity profiles for illustrative coating layers that form partially reflective filters across a set of wavelengths in accordance with an embodiment.

Although the reflectivity profiles of filter 58 have been shown as band pass and band stop filters with sharp changes in reflectivity in FIGS. 8 and 9, this is merely illustrative. As shown in FIG. 10, filter 58 may exhibit a reflectivity profile illustrated by curve 78. As shown, filter 58 may have a peak reflectivity profile similar to a band stop filter, but may have a more gradual transition than the one shown in FIG. 8. The reflectivity of filter 58 may have a width 80 defined as a full-width half-max width, a 10%-90% band-width, or any other desired band-width of at least 5 nm, at least 10 nm, at least 15 nm, at least 25 nm, at least 50 nm, at least 100 nm, of less than 500 nm, or less than 400 nm, as examples, and may cover the entire spectrum of visible wavelengths, may cover a portion of visible wavelengths, may cover some or all infrared wavelengths, and/or may cover some or all infrared wavelengths.

While the reflectivity profile of FIG. 10 has been shown as having a single reflectivity peak, this is merely illustrative. In general, the reflectivity profile may have two or more, three or more, or fewer than 5 peaks at any desired wavelengths. Moreover, filter 58 may also have more gradually changing reflectivity profiles that transmit selected wavelengths (e.g., similar to the band stop filter of FIG. 9, but with more gradually changing reflectivity), and may have both reflectivity peaks and transmission peaks, if desired.

In embodiments in which coating 34 is provided with ink layer 60, the reflectivity of ink layer 60 may also be adjusted to change a color reflected through a transparent layer, such as layer 30 of FIGS. 3-5 to a viewer 36. In general, ink 60 may have any desired reflectivity profile.

Figure 11:
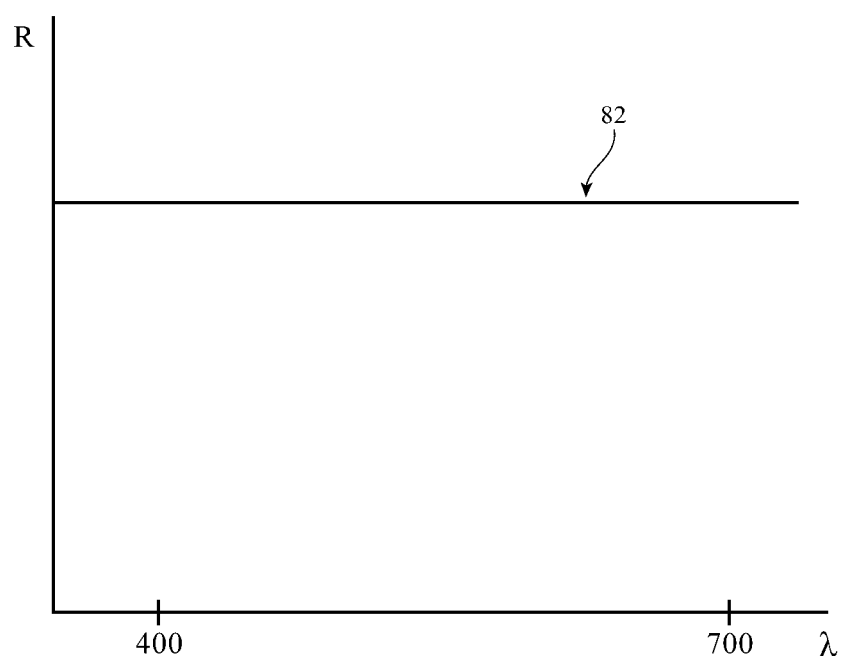
FIG. 11 is a graph of reflectivity profiles for illustrative neutral ink coatings in accordance with an embodiment.

As shown in FIG. 11, ink 60 may exhibit reflectivity profile 82, which may correspond to a neutral reflectivity profile. In particular, ink 60 may reflect a constant (or nearly constant) amount of light across visible wavelengths, and may appear black, gray, white, or other neutral color.

Figure 12:
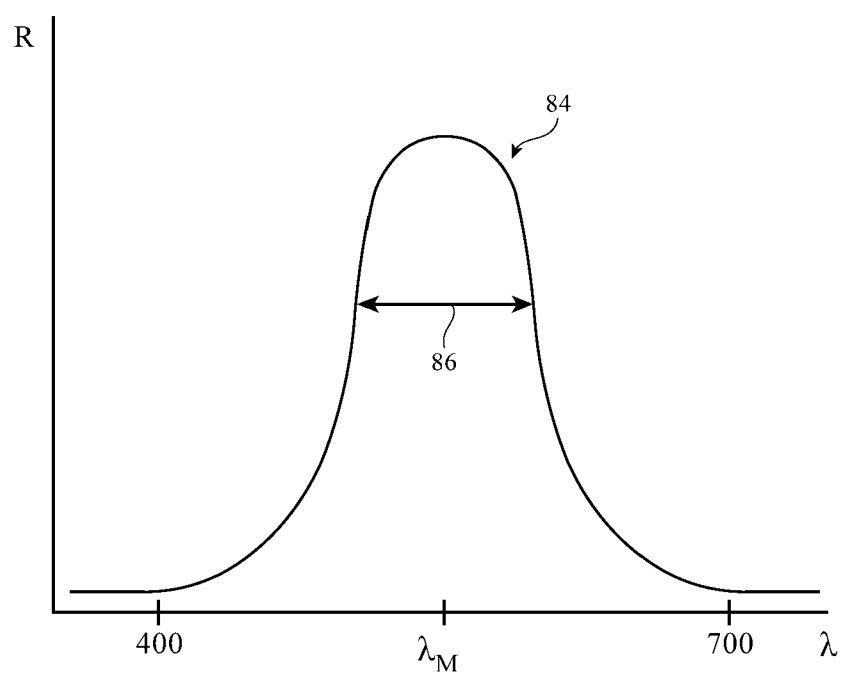
FIG. 12 is a graph of reflectivity profiles for illustrative non-neutral ink coatings in accordance with an embodiment.

As shown in FIG. 12, ink 60 may exhibit reflectivity profile 84, which may correspond to an ink that reflects a desired color (e.g., a color that corresponds to wavelength $\lambda_M$). For example, if $\lambda_M$ is approximately 540 nm, the ink may be a green ink. However, in general, $\lambda_M$ may be any desired wavelength. As shown in FIG. 12, reflectivity profile 84 may cover a range of wavelengths, and may have a width 86 defined as a full-width half-max width, a 10%-90% band-width, or any other desired band-width of at least 5 nm, at least 10 nm, at least 15 nm, at least 25 nm, at least 50 nm, at least 100 nm, of less than 500 nm, or less than 400 nm, as examples.

Figure 13:
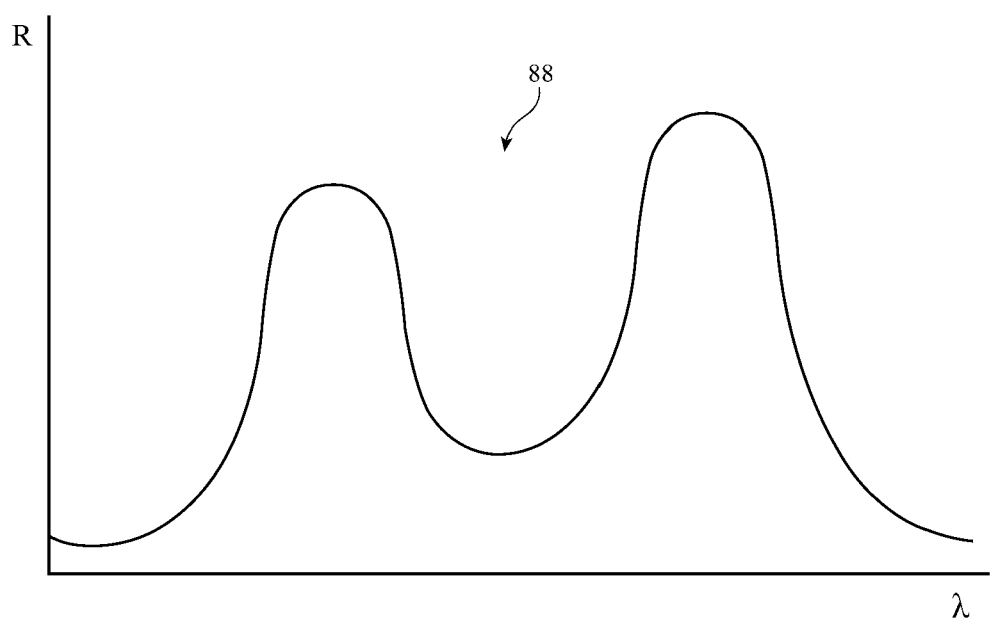
FIG. 13 is a graph of reflectivity profiles for illustrative non-neutral ink coatings that have multiple reflectivity peaks in accordance with an embodiment.

Although reflectivity profile 84 of ink 60 has been illustrated as having a single reflectivity peak in FIG. 12, this is merely illustrative. As shown in FIG. 13, for example, ink 60 may exhibit reflectivity profile 88 and have multiple reflectivity peaks (e.g., reflect light at multiple wavelengths). Each peak of reflectivity profile 88 (as well as each transmission peak in the regions between the reflectivity peaks) may be defined by a width as described above in connection with FIG. 12.

In general, the peak reflectivity and width 86 of reflectivity profile 84 may be selected to tune the optical properties of ink 60, and thereby adjust the optical properties of coating 34, as desired. For example, if ink layer 60 is formed from white material or other brightly colored material, ink layer 60 may help reflect light that has been transmitted through transparent layer 30 outwardly towards viewer 36. When ink layer 60 is black, light transmitted through layer 30 may be absorbed, so that the color of the light reflected from filter 58 towards viewer 36 dominates. Gray ink reflects some but not all of the light that has been transmitted through layer 30. In configurations in which ink 60 has a non-neutral color (e.g., red, green, blue, yellow, gold, etc.), the color of coating 34 will be tinted accordingly. In this way, thin-film interference filter 58 and ink layer 60 may be selected to provide desired coloring of light that passes through layer 30. However, these examples are merely illustrative. In general, any desired ink 60 may be used in combination with any desired filter 58 to produce desired optical effects.

Figure 14:
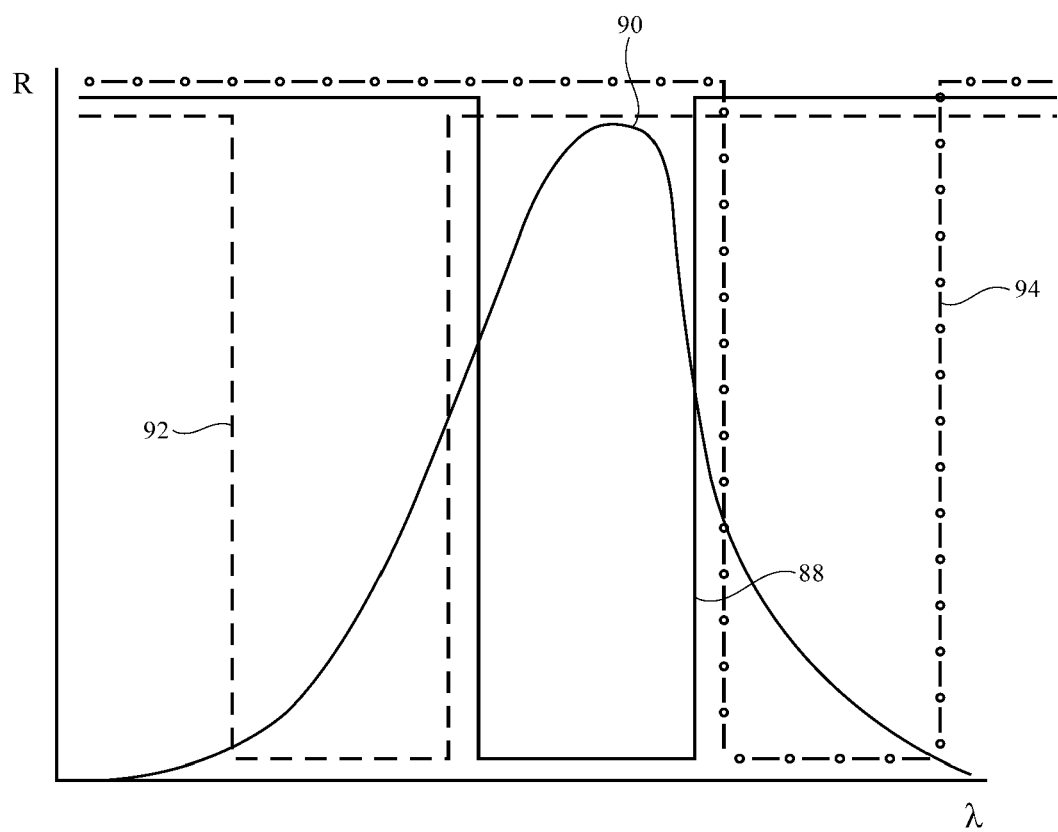
FIG. 14 is a graph of reflectivity profiles for illustrative coatings on textured glass layers with thin-film interference filters that form band pass filters and ink that has absorptivity peaks at different viewing angles in accordance with an embodiment.

An example of using filter 58 and ink 60 in combination to produce desired optical effects is shown in FIG. 14. As shown in FIG. 14, filter 58 may be a band pass filter with reflectivity profile 88 when viewed on-axis (e.g, at a 0° viewing angle or other on-axis angle). The pass band of reflectivity profile 88 may be aligned with a peak of reflectivity profile 90 of ink 60 when viewed on-axis. As a result, the overall coating 34 (e.g., filter 58 and ink 60) may reflect a neutral color and appear neutral when viewed on-axis.

When viewed off-axis (e.g., at a grazing angle such as 80° or other desired angle as shown in FIGS. 3 and 4), the reflectivity profile of ink 60 may shift, as shown by reflectivity profile 92. When the pass band shifts to lower wavelengths, it may no longer be aligned with the peak reflectivity of ink 90, thereby allowing wavelengths aligned with the pass band to pass through filter 58, and reflecting a non-neutral complementary color to a viewer of coating 34. For example, reflectivity profile 92 may shift to blue wavelengths at high viewing angles, allowing blue light to pass through filter 58, and coating 34 may therefore appear red to a viewer. However, these colors are merely illustrative. In general, any the pass band of reflectivity profile 92 may be allow any desired light to pass through filter 58.

Alternatively, filter 58 may have a reflectivity profile corresponding to curve 94 when viewed on-axis. Curve 94 may have a pass band that is not aligned with the reflectivity peak of ink 60 at on-axis viewing angles. For example, the pass band may be aligned with red wavelengths, thereby allowing red light to pass through filter 58, and coating 34 may therefore appear blue to a viewer. When viewed at high angles, however, the pass band may shift to curve 88 and be aligned with the reflectivity peak of ink 60, and coating 34 may therefore appear neutral to a viewer. Alternatively, the pass band may shift to curve 92 at high viewing angles, and coating 34 may therefore appear red to a user. In one embodiment, filter 58 may be configured to shift from reflectivity profile 94 when viewed on-axis, to reflectivity profile 88 when viewed at moderate angles, and to reflectivity profile 92 when viewed at higher angles. In this way, coating 34 may be designed to appear blue on-axis, neutral at moderate angles, and red off-axis. However, the colors mentioned in these examples are merely illustrative. In general, reflectivity profiles 90, 92, and 94 may be aligned with any desired wavelengths, and ink 60 may have absorptivity peaks at any desired wavelengths, to provide coating 34 with desired color-shifting properties.

While FIG. 14 shows ink 60 having an absorptivity peak aligned with a pass band of filter 58, this is merely illustrative. In some embodiments, a filter may be provided that reduces reflectivity at all wavelengths when viewed at high angles.

Figure 15:
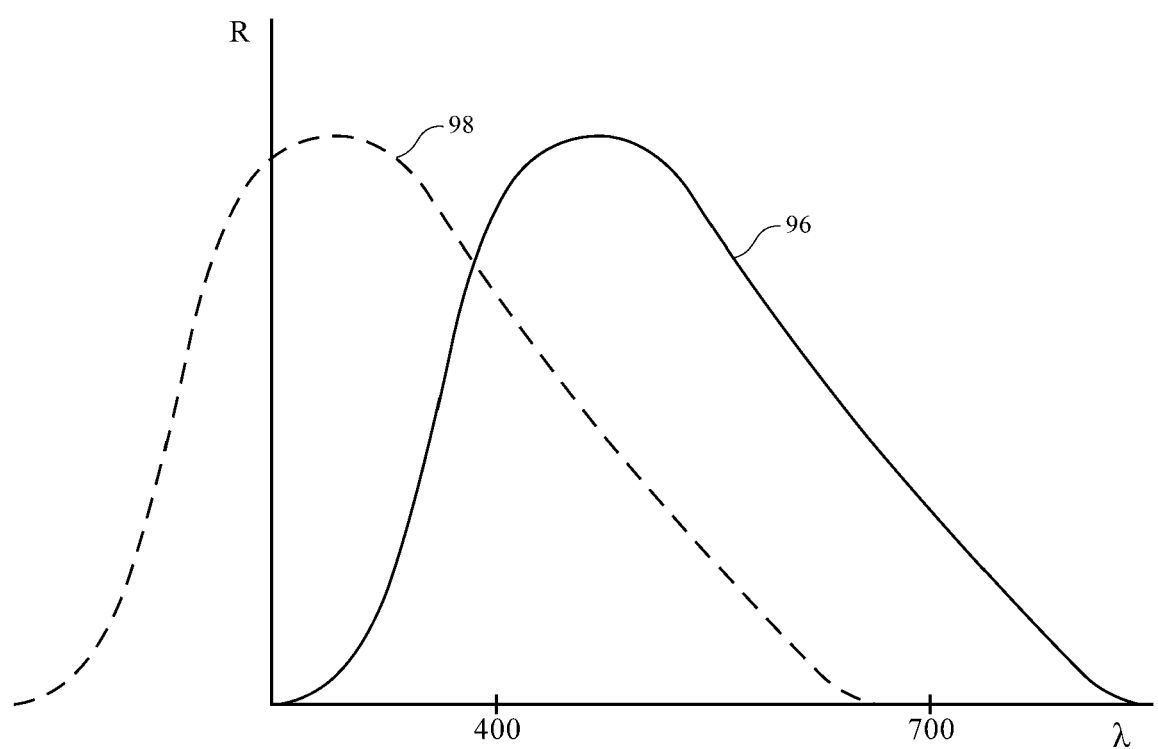
FIG. 15 is a graph of reflectivity profiles for illustrative thin-film interference filters at different viewing angles that have decreasing reflectivity across the visible spectrum.

As shown in FIG. 15, filter 58 may have an absorptivity profile 96 when viewed on-axis, which may shift to absorptivity profile 98 when viewed off-axis. While absorptivity profile 96 reflects light across the visible spectrum (e.g., from 400-700 nm) to some degree, absorptivity profile 98 reflects less light at all visible wavelengths. In this way, any ink 60 provided behind filter 58 may be more visible when viewed at high angles, causing a color associated with ink 60 to become more noticeable at higher angles. Therefore, any color may be used for ink 60 to impart that color to a user at high angles.

Figure 16:
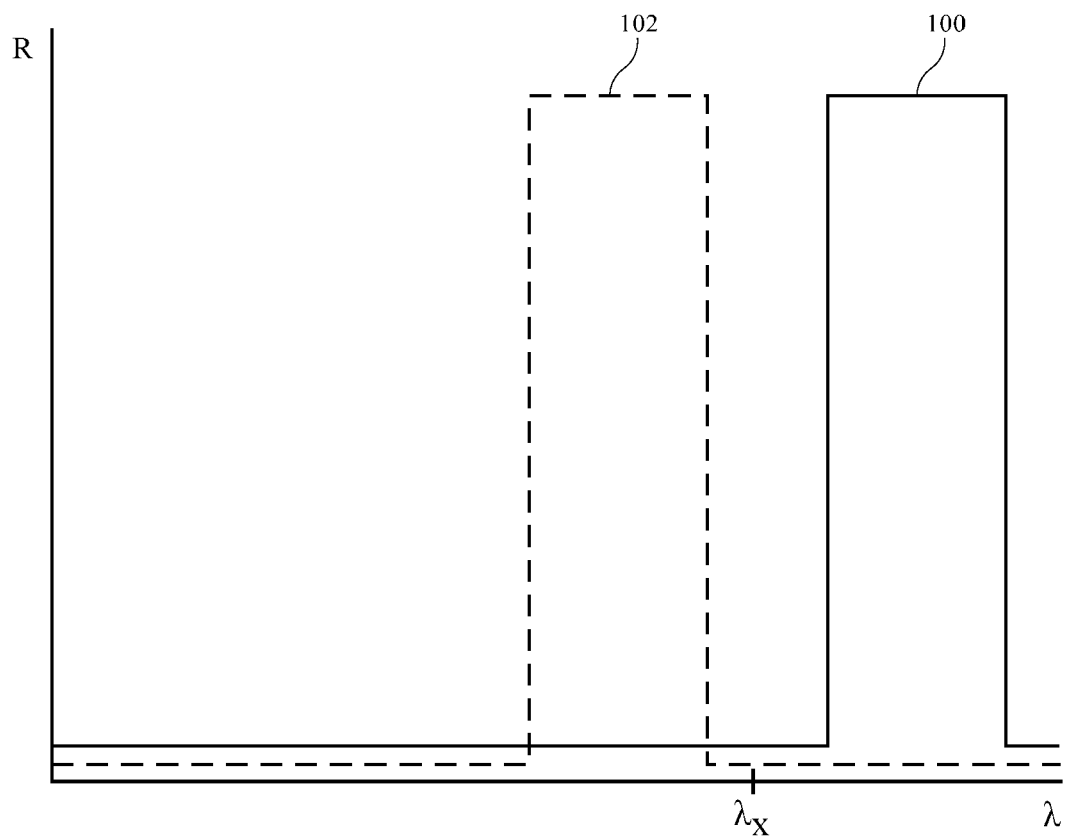
FIG. 16 is a graph of reflectivity profiles for illustrative coatings that form band stop filters on a textured glass layer at different viewing angles in accordance with an embodiment.

In some embodiments, it may be desired to form filter 58 as a band stop filter. As shown in FIG. 16, filter 58 may exhibit reflectivity profile 100 when viewed on-axis. Reflectivity profile 100 may have a stop band at desired wavelengths (e.g., wavelengths greater than $\lambda_x$). In some embodiments, the stop band of reflectivity profile 100 may be in the infrared range (e.g, in the range of 700-900 nm). In this case, filter 58 may not reflect light when viewed on-axis and therefore appear neutral. However, when viewed off-axis, filter 58 may exhibit reflectivity profile 102, which may reflect light in the visible spectrum. For example, reflectivity profile 102 may have a stop band in red wavelengths, thereby appearing red to a viewer. However, this is merely illustrative. In general, band stop filters may be used at any desired wavelengths to provide any desired color-shift.

Although the embodiment of FIG. 16 does not show an absorptivity profile for ink 60, coating 34 may be provided with or without ink when filter 58 has a stop band at infrared wavelengths. For example, in some embodiments, ink 60 may be used to impart a color on coating 34 at on-axis viewing angles and to impart a different color at off-axis viewing angles when filter 58 reflects an additional color.

Figure 17:
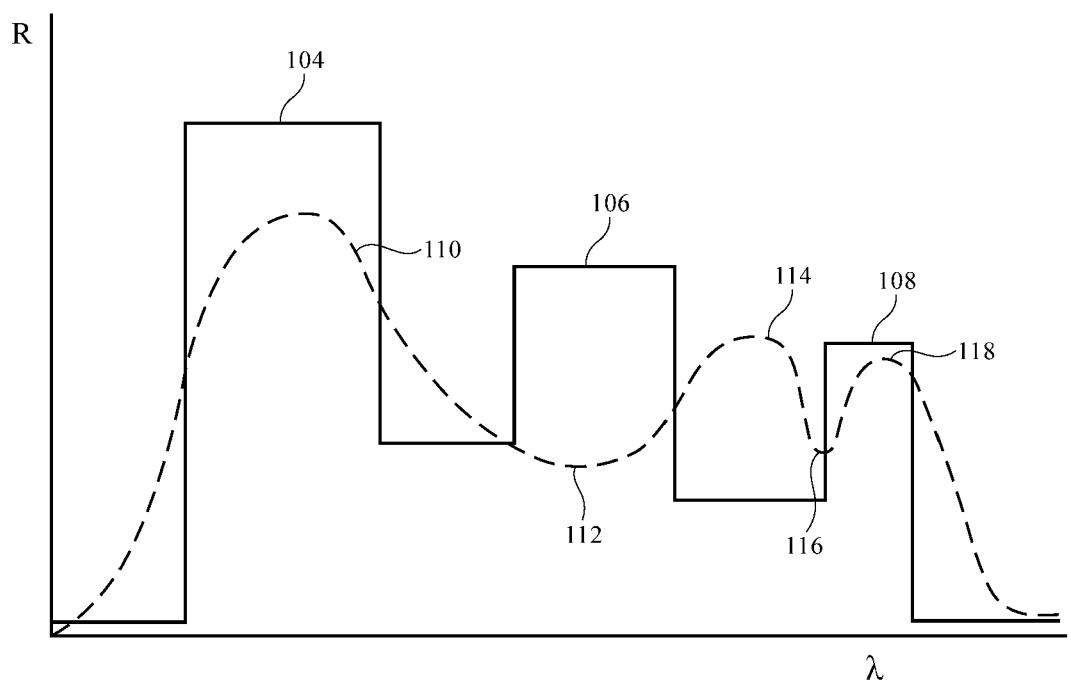
FIG. 17 is a graph of reflectivity profiles for illustrative coatings having thin-film interference filters and ink layers with varying reflectivity peaks in accordance with an embodiment.

An example of reflectivity profiles of coating 34 having a filter 58 having multiple reflectivity peaks (e.g., stop bands) and ink 60 with multiple reflectivity peaks is show in FIG. 17.

As shown in FIG. 17, filter 58 may have a reflectivity profile with peaks (e.g., stop bands) 104, 106, and 108 when viewed on-axis. Each of these peaks may correspond to different reflectivity values, as illustrated in FIG. 17, or at least some of the peaks may have the same reflectivity values. Although peak 104 has a greater reflectivity than peak 106, which in turn has a greater reflectivity than peak 108, this is merely illustrative. In general, the reflectivity profile of filter 58 may have any number of reflectivity peaks that correspond to any desired reflectivity values.

Ink 60 may have multiple reflectivity peaks when viewed on-axis, as well. As shown in FIG. 17, ink 60 may have stop bands 110, 114, and 118. Some stop bands such as stop bands 110 and 118 may be aligned with peaks in the reflectivity profile of filter 58, such as peaks 104 and 108. Other reflectivity peaks of ink 60, such as peak 114, may be aligned with portions of the filter absorptivity profile having higher transmission (e.g., pass bands). As a result, filter stop bands, such as stop band 106 may align with highly transmissive portions of the ink profile, such as portion 112. Alternatively or additionally, transmissive ink portions, such as portion 106 may overlap with a pass band of the filter. However, the examples shown in FIG. 17 are merely illustrative. In general, the stop bands and pass bands corresponding to filter 58 may align with reflectivity peaks and/or transmission peaks of ink 60 in any desired manner to provide desired optical properties of coating 34.

Figure 18:
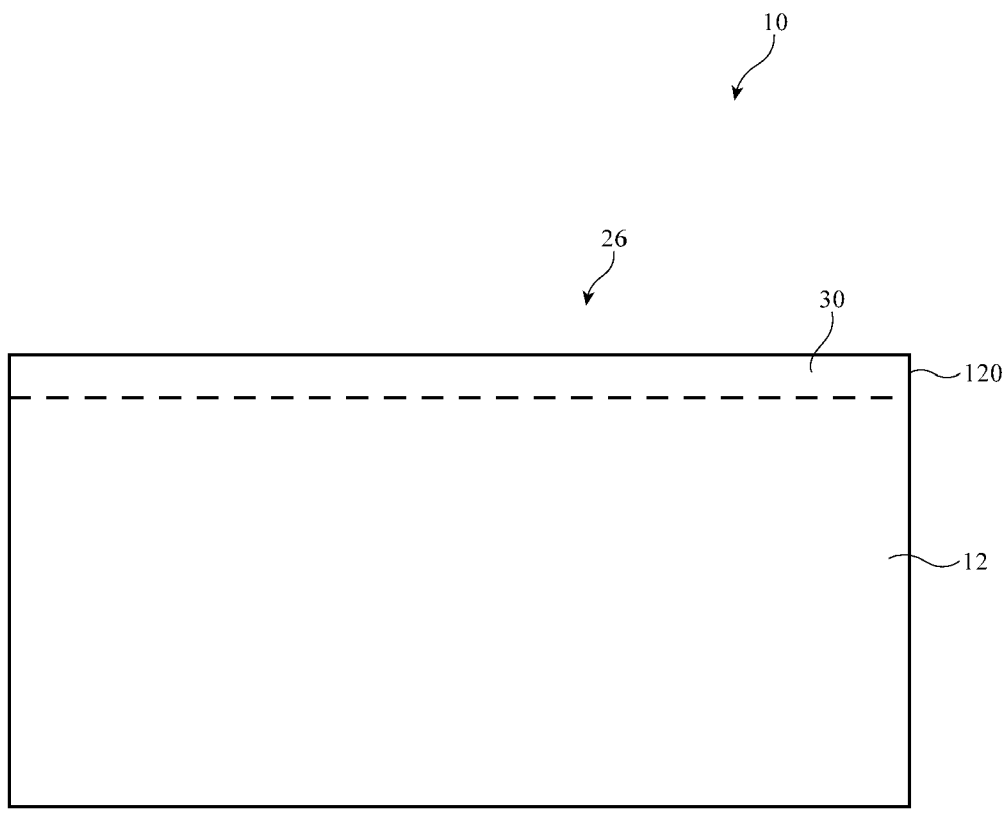
FIG. 18 is a cross-sectional side view of a glass surface that forms a portion of an electronic device housing and has edge surfaces exposed to an exterior of the device in accordance with an embodiment.

Layer 30 having coating 34 may form a portion of housing 12, as shown in FIGS. 2 and 3. In particular, as shown in FIG. 18, layer 30 may have a top portion that forms an exterior portion of housing 12 (e.g., the outer surface of layer 30, which may be textured, faces exterior 26). Additionally, layer 30 may have an opposing inner surface to which coating 34 may be applied. Between the outer surface and inner surface, layer 30 may have an edge surface 120 that is exposed to exterior 26 of device 10. In particular, it may be desirable to leave edge surface uncovered and viewable to a user. In some cases, the texture of layer 30 (e.g., textured surface 54) and coating 34 may be tuned such that high angle light exits layer 30 through edge surface 120, and may therefore create a glowing effect at the edge surface.

Although not shown, the outer surface of layer 30 (e.g., textured surface 54) may be coated with any desired layers. These layers may be protective layers, oleophobic layers, and/or antireflection layers, as examples.

Figure 19:
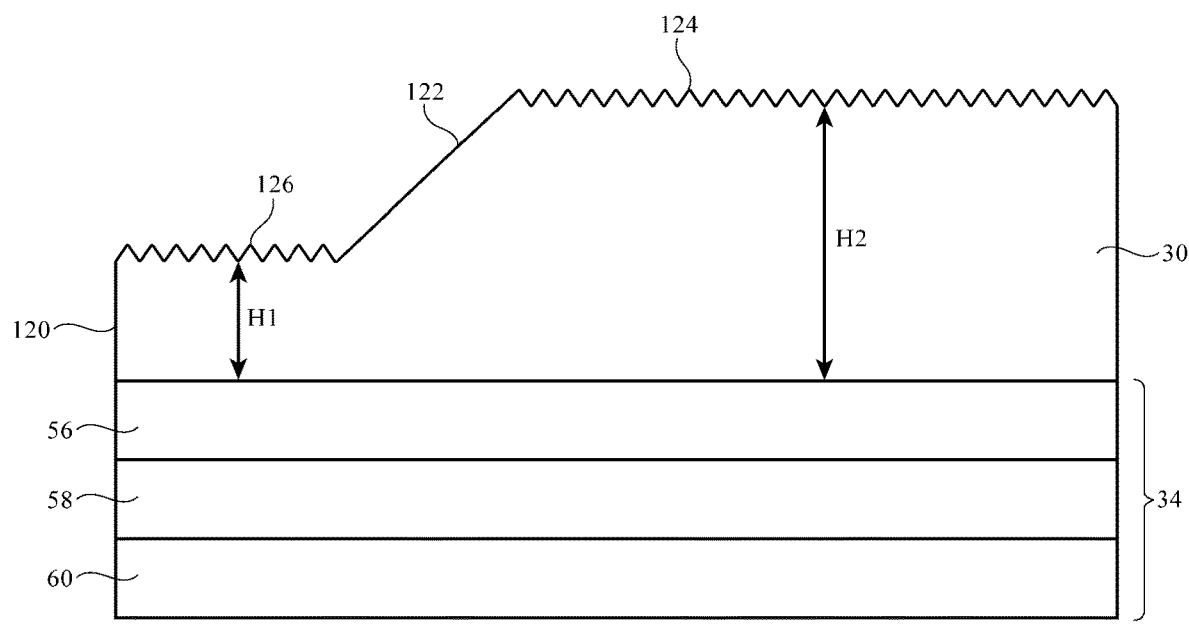
FIG. 19 is a cross-sectional side view of a textured glass layer having textured surfaces of different heights and having a coating formed from a plurality of layers in accordance with an embodiment.

In some embodiments, portions of layer 30 may have different thicknesses. As shown in FIG. 19, for example, layer 30 may have a first portion with thickness H1 and a second portion with thickness H2 that is greater than thickness H1. As a result, layer 30 may have outer surfaces 122, 124, and 126, as well as edge surface 120. In one embodiment, surfaces 124 and 126 (e.g., the planar outer surfaces) may be textured, while surface 122 (e.g., the tapered outer surface) may be polished. These surfaces, combined with coating 34, may result in glowing effects at edge surface 120 and surface 122 when viewed at high angles. However, this arrangement is merely illustrative. In general, layer 130 may have any number of surfaces that are fully textured, partially textured, untextured, or polished to provide desired optical effects.

The foregoing is merely illustrative and various modifications can be made to the described embodiments. The foregoing embodiments may be implemented individually or in any combination.

What is claimed is:

1. An electronic device having opposing front and rear faces and an interior, the electronic device comprising:
    a display on the front face;
    a transparent layer that forms a housing wall on the rear face, wherein the transparent layer has an inner surface facing the interior and an opposing outer surface with surface texture; and
    a coating on the inner surface comprising a thin-film interference filter, wherein the coating is neutral at on-axis viewing angles and non-neutral at off-axis viewing angles.

2. The electronic device defined in claim 1 wherein the thin-film interference filter is a coating layer on the inner surface of the transparent layer.

3. The electronic device defined in claim 1 wherein the coating further comprises a buffer layer on the inner surface of the transparent layer and wherein the thin-film interference filter is on the buffer layer.

4. The electronic device defined in claim 1 wherein the thin-film interference filter is formed on a polymer film and attached to the transparent layer.

5. The electronic device defined in claim 1 wherein the surface texture is formed from protrusions selected from the group consisting of: semi-spherical bumps and semi-cylindrical bumps.

6. The electronic device defined in claim 1 wherein the surface texture comprises randomly distributed protrusions and recesses on the outer surface of the transparent layer.

7. The electronic device defined in claim 1 wherein the on-axis neutral coating exhibits first a and b color coordinates in LAB color space, and wherein a root sum squared of the first a and b color coordinates is less than two in magnitude at a viewing angle of 0°.

8. The electronic device defined in claim 7 wherein the off-axis non-neutral coating exhibits second a and b color coordinates in LAB color space, and wherein a root sum squared of the second a and b color coordinates is greater than three in magnitude at a viewing angle of 80°.

9. The electronic device defined in claim 8 wherein the thin-film interference filter has a reflectivity of at least 80% from 400 nm to 700 nm.

10. The electronic device defined in claim 8 wherein the thin-film interference filter has an L luminance coordinate in LAB color space that changes less than 25% when viewed at viewing angles between 0° and 75°.

11. An electronic device having an interior and an exterior, the electronic device comprising:
    a housing having a rear glass layer that has a textured surface that faces the exterior and an inner surface that faces the interior; and
    a coating on the inner surface, wherein the coating comprises a thin-film interference filter and wherein the coating is neutral when viewed on-axis and non-neutral when viewed off-axis.

12. The electronic device defined in claim 11 wherein the thin-film interference filter is a band stop filter with a stop band at infrared wavelengths when viewed on-axis.

13. The electronic device defined in claim 12 wherein the stop band is at visible wavelengths when viewed off-axis.

14. The electronic device defined in claim 11 wherein the textured surface is a first textured surface and is a first distance from the inner surface of the rear glass layer, and wherein the rear glass layer comprises a second textured surface at a second distance from the inner surface that is different from the first distance and a tapered surface between the first textured surface and the second textured surface.

* * * * *